(12) United States Patent
Adlerstein

(10) Patent No.: US 8,154,439 B2
(45) Date of Patent: Apr. 10, 2012

(54) SUB-MILLIMETER WAVE IMAGING SYSTEM

(75) Inventor: Michael G. Adlerstein, Wellesley, MA (US)

(73) Assignee: Raytheon Company, Waltham, MA (US)

( * ) Notice: Subject to any disclaimer, the term of this patent is extended or adjusted under 35 U.S.C. 154(b) by 418 days.

(21) Appl. No.: 12/470,110

(22) Filed: May 21, 2009

(65) Prior Publication Data

US 2010/0295724 A1    Nov. 25, 2010

(51) Int. Cl.
*G01S 13/89* (2006.01)
(52) U.S. Cl. .......................... 342/179; 342/22; 342/175
(58) Field of Classification Search .................. 342/179, 342/21, 22, 175
See application file for complete search history.

(56) References Cited

U.S. PATENT DOCUMENTS

| | | | | |
|---|---|---|---|---|
| 4,360,812 A * | 11/1982 | Peperone | ...................... | 342/128 |
| 5,148,178 A * | 9/1992 | Holzer et al. | .................. | 342/127 |
| 5,521,600 A * | 5/1996 | McEwan | ......................... | 342/27 |
| 5,682,164 A * | 10/1997 | McEwan | ......................... | 342/27 |
| 6,426,716 B1 * | 7/2002 | McEwan | ......................... | 342/28 |
| 6,611,224 B1 * | 8/2003 | Nysen et al. | .................... | 342/42 |
| 6,834,591 B2 * | 12/2004 | Rawcliffe et al. | ............. | 102/214 |
| 7,199,713 B2 * | 4/2007 | Barink et al. | ............. | 340/572.1 |
| 7,379,016 B1 * | 5/2008 | McEwan | ....................... | 342/134 |
| 7,432,847 B2 * | 10/2008 | Fedotov et al. | ................. | 342/28 |
| 8,044,846 B1 * | 10/2011 | Urkowitz et al. | ............. | 342/179 |
| 8,054,217 B2 * | 11/2011 | Bruyere et al. | ................ | 342/179 |
| 2002/0144619 A1 * | 10/2002 | Rawcliffe et al. | ............. | 102/214 |
| 2008/0074307 A1 * | 3/2008 | Boric-Lubecke et al. | ...... | 342/28 |
| 2010/0295724 A1 * | 11/2010 | Adlerstein | ..................... | 342/201 |

OTHER PUBLICATIONS

"Submillimeter-wave technology", Sci-Tech Encyclopedia: Submillimeter-wave, 2 pages, http://www.answers.com/topics/submillimeter-wave-technology.

* cited by examiner

*Primary Examiner* — John Sotomayor
(74) *Attorney, Agent, or Firm* — Daly, Crowley, Mofford & Durkee, LLP

(57) ABSTRACT

A system for detecting the amplitude of radio frequency energy includes: an antenna for receiving the radio frequency energy; a modulator, responsive to a reference frequency signal, for pulse modulating the received radio frequency energy at the reference frequency; a detector for converting such pulse modulated signal to a detector output signal having a low frequency component representative of the amplitude of the received radio frequency energy, in summation with DC bias current, and a high frequency component at the reference signal; and a high pass or band pass filter fed for the detector output signal for passing the high frequency components and for removing the low frequency component. A phase detector, with or without a subsequent IF amplifier, is fed by the reference frequency and the high frequency components for producing an output representative of the high frequency components. A low noise amplifier is fed by the antenna and has a bias fed by the reference frequency signal for modulating the received radio frequency energy at the reference frequency.

16 Claims, 6 Drawing Sheets

SUB-MILLIMETER WAVE IMAGING SYSTEM

TECHNICAL FIELD

This invention relates generally to sub-millimeter wave imaging systems.

BACKGROUND AND SUMMARY

As is known in the art, there are advantages of imaging using the sub-millimeter (Sub-mm) wave portion of the spectrum compared to microwave and infrared. As is also known, sub-millimeter wave imaging systems typically use Focal Plane Arrays (FPAs) in conjunction with focusing optics. To avoid diffraction limits on image resolution, systems large compared with wavelengths are needed while element spacing should be of order half wavelength. For microwave radiation, resolution can be achieved with very large antennas or with moving sources and detectors that form a Synthetic Aperture Radar (SAR). For Long Wavelength Infrared Radiation (LWIR) imaging systems will be smaller. However, atmospheric absorption can be a problem as can be smoke and clouds.

The Sub-mmWave region is a good compromise. The range frequency of interest often quoted is around 220-1000 GHz, see Cowley, A. M. and Sorensen; Quantitative Comparison of Solid State Microwave Detectors; IEEE MTT-14 no.12 pp 588-602 (1966). There are two basic imaging approaches (1) active—where the object being imaged is illuminated by a power source with reflected energy measured and (2) passive—where black body radiation is used to distinguish small temperature differences in the object being imaged in order to render an image. In passive systems, the signal levels are very low compared to active. Thus, the sensors which are used must add very little noise which could obscure the signal of interest. The Figure of Merit often used for this property is Noise Equivalent Power (NEP), see "Zero bias resonant tunnel Schottky contact diode for wide-band direct detection" by Chahal, P.; Morris, F.; Frazier, G. published in Electron Device Letters, IEEE Volume 26, Issue 12, December 2005 Page(s): 894-896. This detector property, that should be as low as possible, depends on the design of the detector. Important is not only the device used but also the architecture of the circuitry around the detector. Some implementation examples are shown in FIGS. 1A and 1B.

In the implementation shown in FIG. 1A, the diode acts to rectify the received incoming RF energy signal producing an additive DC output proportional to the amplitude of the input signal. The Intermediate Frequency (IF) amplifier is then a DC amplifier which is coupled to the diode by a low pass filter such as that shown in FIG. 2. The forward bias DC voltage (V) is selected to maximize a combination of NEP (Noise Equivalent Power) and dynamic range of the detector. A detected unmodulated signal results in a change in the DC voltage across the diode. Hence the lowest detectable signal measured in this way is determined by the background bias current, I, that establishes a voltage V across the low pass filter. There are various noise sources within the biased diode such as shot noise, thermal noise and 1/f noise. However, at low levels the desired signal competes with a voltage floor equal to V. This is illustrated in FIG. 3. It is noted in the figure that the resultant bias voltage acting as a floor limits the low end of power detectability. If the bias current and the hence the lo bias voltage could be reduced, a lower level signal would be detectable. However, the bias point chosen relates to sensitivity and NEP for higher RF energy levels. The ideal for this detection mode would be a zero bias detector. Such detectors are possible but more complex semiconductor implementations compared with Schottky devices.

It is known in the art that Chopped Detection (CD) significantly enhances detector sensitivity in optical imaging systems. In CD optical detection systems a spinning perforated wheel is placed in front of the optical beam. The spinning wheel periodically interrupts the beam. This transforms the DC level of the detector into a pulse modulated signal and thereby enables the use of a high pass filter which blocks the DC bias voltage from influencing the amplifier. A low pass filter at the output of the IF amplifier averages the pulsed output and is therefore representative of the DC level of the received signal. In short, only the DC level of the received signal is up-converted in frequency from DC to a predetermined IF signal (i.e., the chopping frequency), the IF signal is amplified, and the amplified IF signal is then down-converted in frequency back to DC. Chopping frequencies are selected based upon the nature of the filter which can be implemented given the sampling time and the low frequency noise spectrum of the diode. A typical chopping frequency would be in the KHz range.

It is also known in the art that Phase Sensitive Detection (PSD) has advantages over CD. In PSD, the phase and frequency of the chopped signal is replicated in a Phase Sensitive Detector such as that shown in FIGS. 5A and 5B. Without the ability to implement CD, it would not be possible to further improve system performance by employing Phase Sensitive Detection (PSD).

In accordance with the invention, a system is provided for detecting amplitude of radio frequency energy. The system includes: an antenna for receiving the radio frequency energy; a modulator, responsive to a reference frequency signal, for pulse modulating the received radio frequency energy at the reference frequency; a detector for homodyning the pulse modulated signal to convert such pulse modulated signal to a detector output signal having a low frequency component representative of the amplitude of the received radio frequency energy and a high frequency component representative of the amplitude at the reference frequency signal; and a high pass or pass band filter at the reference frequency fed for the detector output signal for passing the high frequency components and for removing the low frequency component.

In one embodiment, the diode is DC biased and the high pass or band pass filter filters out the DC bias and low frequency noise by passing the signal through a series blocking capacitor.

In one embodiment, the system includes a phase detector fed by the reference frequency signal and the high frequency components of the pulse modulated (i.e., chopped) radio frequency energy passed by the high pass or band pass centered at the reference frequency. This produces an output representative of a phase difference between the reference frequency signal and the amplitude of the high frequency components pulse modulated radio frequency energy.

In one embodiment, the modulator includes a Low Noise Amplifier (LNA) fed by the antenna and having a bias fed by the reference frequency signal. The LNA pulse modulates the received radio frequency energy at the reference frequency.

With such an arrangement, high levels of integration of components enable full Phase Sensitive Detection (PSD) capability. Bias modulation of a Low Noise Amplifier (LNA) eliminates the loss and reduction of Noise Figure introduced by a switch in series with the received signal. The effect of PSD is equivalent to utilizing a band pass filter centered at the reference frequency. The filter has vary narrow bandwidth that is determined by the data integration time at the output of the detector. The low pass or band pass (with bandwidth as small as possible relative to the reference frequency) effectively accumulates the results of repeated sampling, thereby averaging noise to zero. Other considerations relating to implementation would be power dissipation and circuit size. In alternative embodiments, a commonly fed local oscillator driving the chopping (i,e., pulse modulating) and PSD could be associated with several detector circuits.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
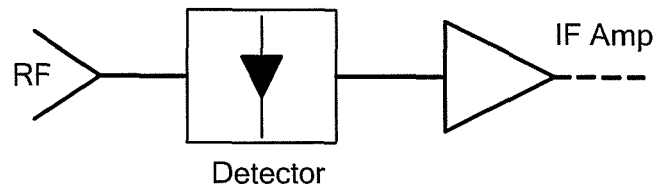
FIGS. 1A and 1B show two Configurations for Direct Detection of THz Radiation according to the PRIOR ART.
Figure 1B:
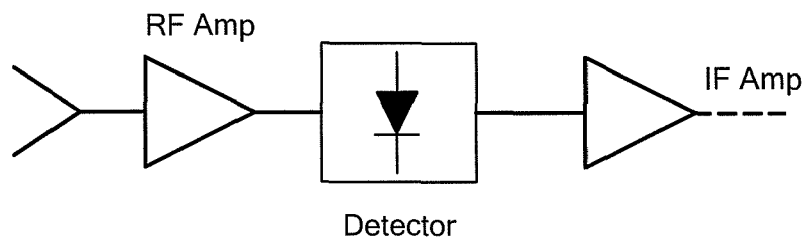
Figure 2:
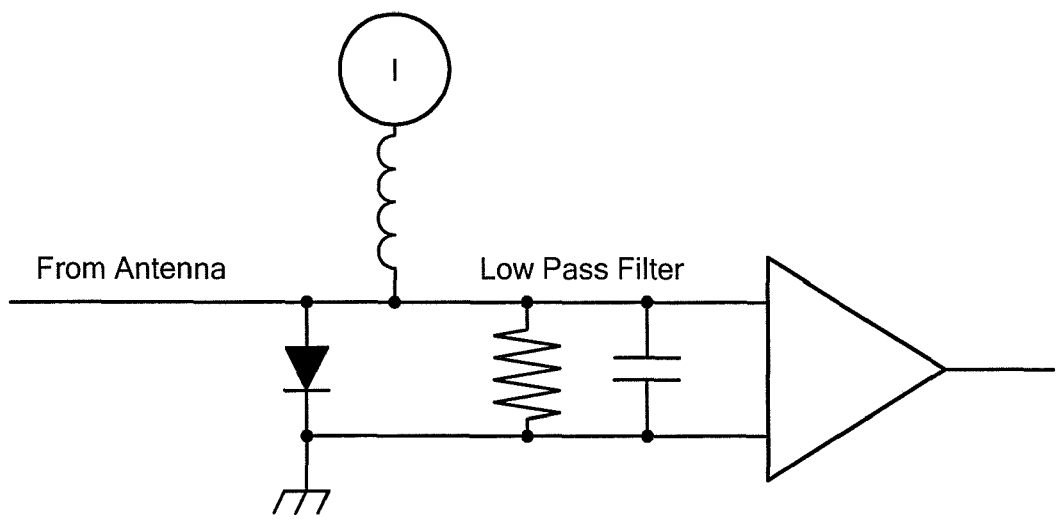
FIG. 2 is a schematic diagram of a system for Direct Detection Using a DC current Biased Diode and a Low Pass Filter according to the PRIOR ART.
Figure 3:
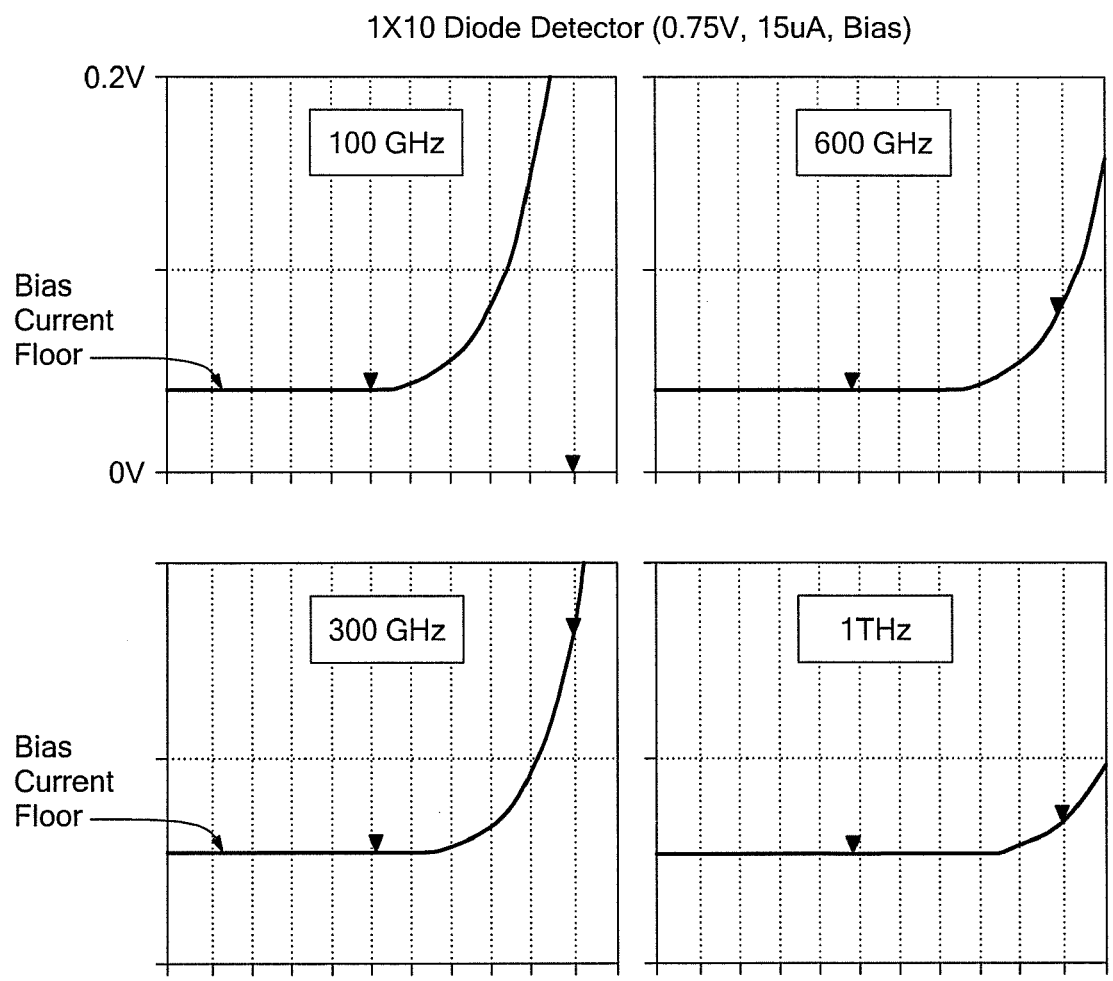
FIG. 3 shows Calculated Responses by a Diode in the Configuration shown in FIG. 2 for four frequencies, DC output voltage is plotted versus power input.
Figure 4:
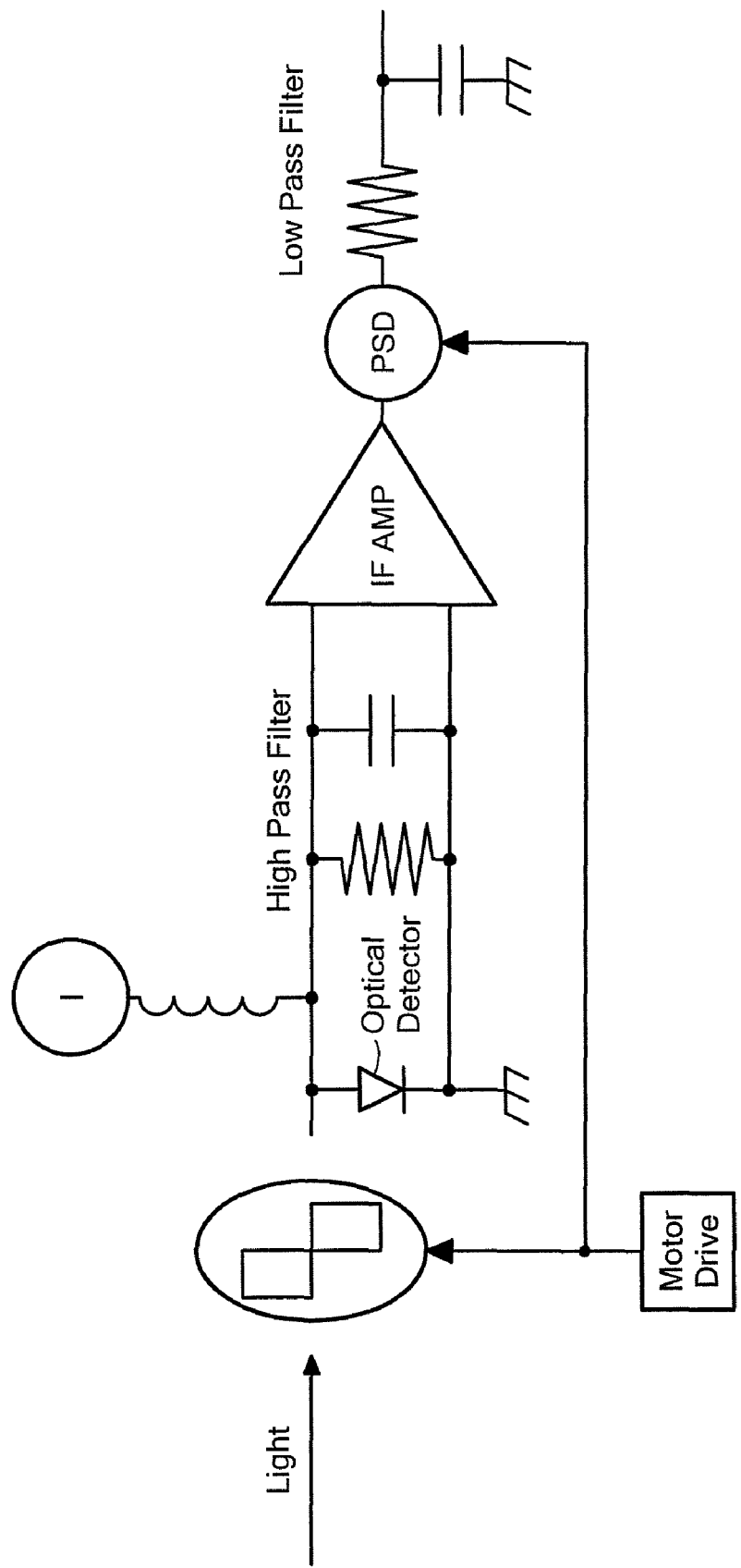
FIG. 4 is diagram of apparatus used In Chopped Detection (CD), the Spinning Wheel Periodically Interrupts the Signal in Chopped Detection according to the PRIOR ART.
Figure 5:
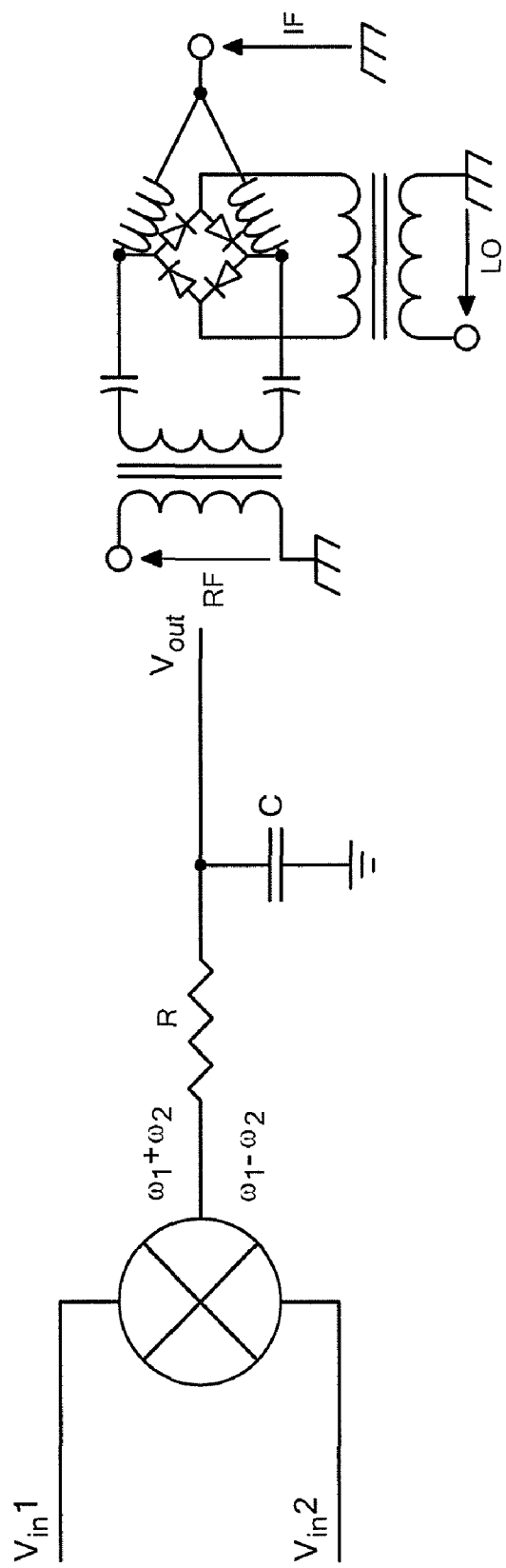
FIG. 5 shows, in the left side thereof, a General Implementation of the PSD where $\omega_1=\omega_1$ including a Low Pass Filter at the Output and the right side shows possible analog implementation of a mixer according to the PRIOR ART.
Figure 6:
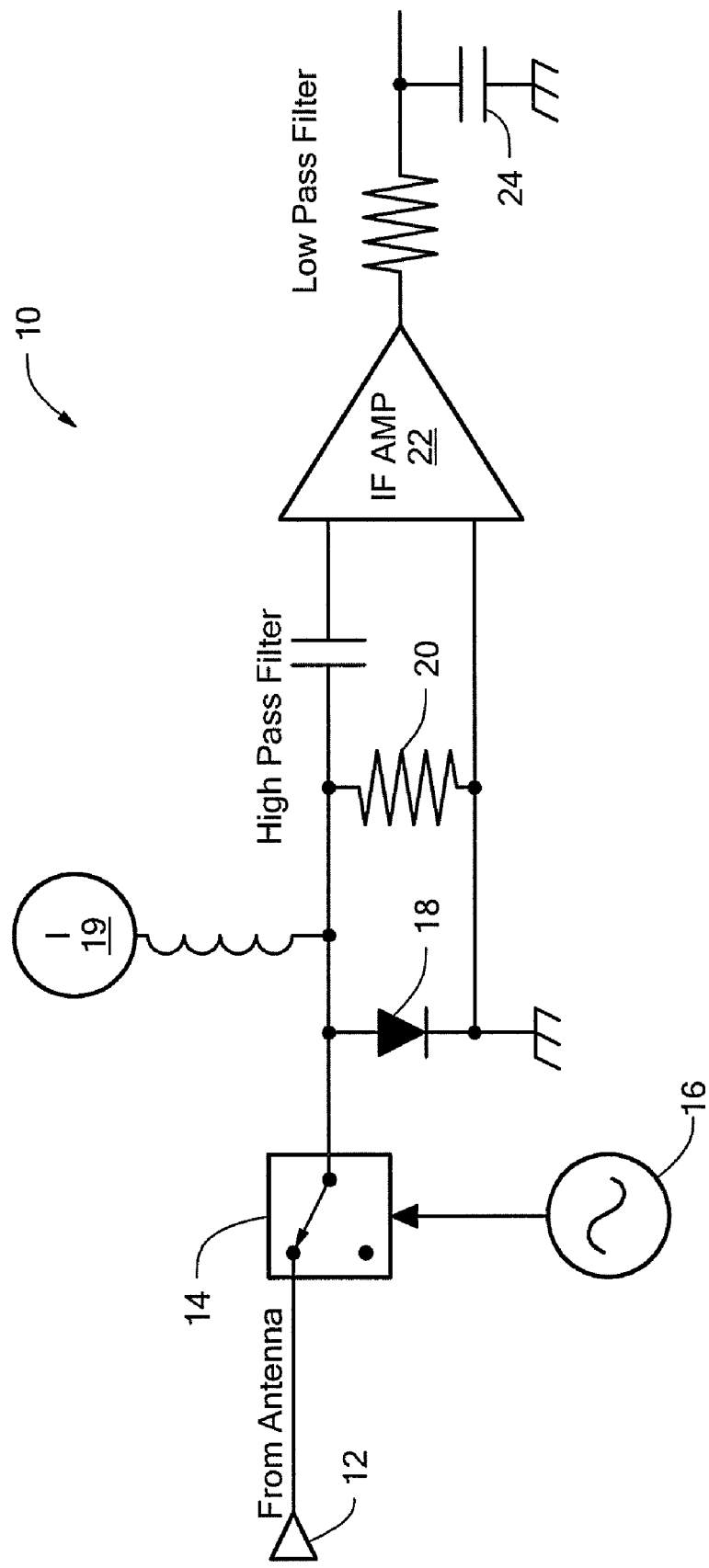
FIG. 6 is schematic diagram of a system for Periodic Switching of the Input Signal Enabling the Use of a Low Pass Filter Thereby Achieving Chopped Detection according to the invention.

Referring now to FIG. 6, a system 10 is shown for detecting amplitude of radio frequency energy. The system 10 is an element of a focal plane array (FPA). The system 10 includes: an antenna 12 for receiving the radio frequency energy; a modulator 14, here having a switch 15 responsive to a reference frequency signal produced by an oscillator 16, for pulse modulating the received radio frequency energy at the reference frequency; a detector 18, here a diode detector, having a bias current I produced by DC supply 19. The detector 18 homodynes the pulse modulated signal to convert such pulse modulated signal to a detector output signal having a low frequency component representative of the amplitude of the received radio frequency energy as well as the DC current bias and a high frequency component at the reference frequency signal representative of the amplitude. A high pass filter 20 is fed for the detector 18 output signal for passing the high frequency components and for removing the low frequency component. A band pass filter in another embodiment might replace the high pass filter 20. The bandpass filter is centered at the reference frequency and has a bandwidth of a few percent of the center frequency. An intermediate frequency (IF) signal amplifier 22 has an input fed by an output of the high pass filter 20. A low pass filter 24 has an input fed by an output of the IF amplifier 22, as shown. A band pass filter in another embodiment might replace the low pass filter. The bandpass filter is centered at the reference frequency and has a bandwidth of a few percent of the center frequency. The periodic switching of the received RF signal transforms the DC level of the received signal into a pulse modulated signal and thereby enables the use of a high pass or band pass filter 20 that blocks the DC bias current from supply 19 from influencing the amplifier 22. The low pass or band pass filter 24 at the output of the IF amplifier 22 averages the pulsed output and is therefore representative of the DC level of the received signal. In short, the DC level produced by the detector 18 is up-converted in frequency from DC to a predetermined IF signal (i.e., the switching frequency is the frequency of the signal produced by the oscillator 16), the IF signal is amplified in IF amplifier 22, and the amplified IF signal is then filtered back to DC by the low pass or band pass filter 24.

Figure 7:
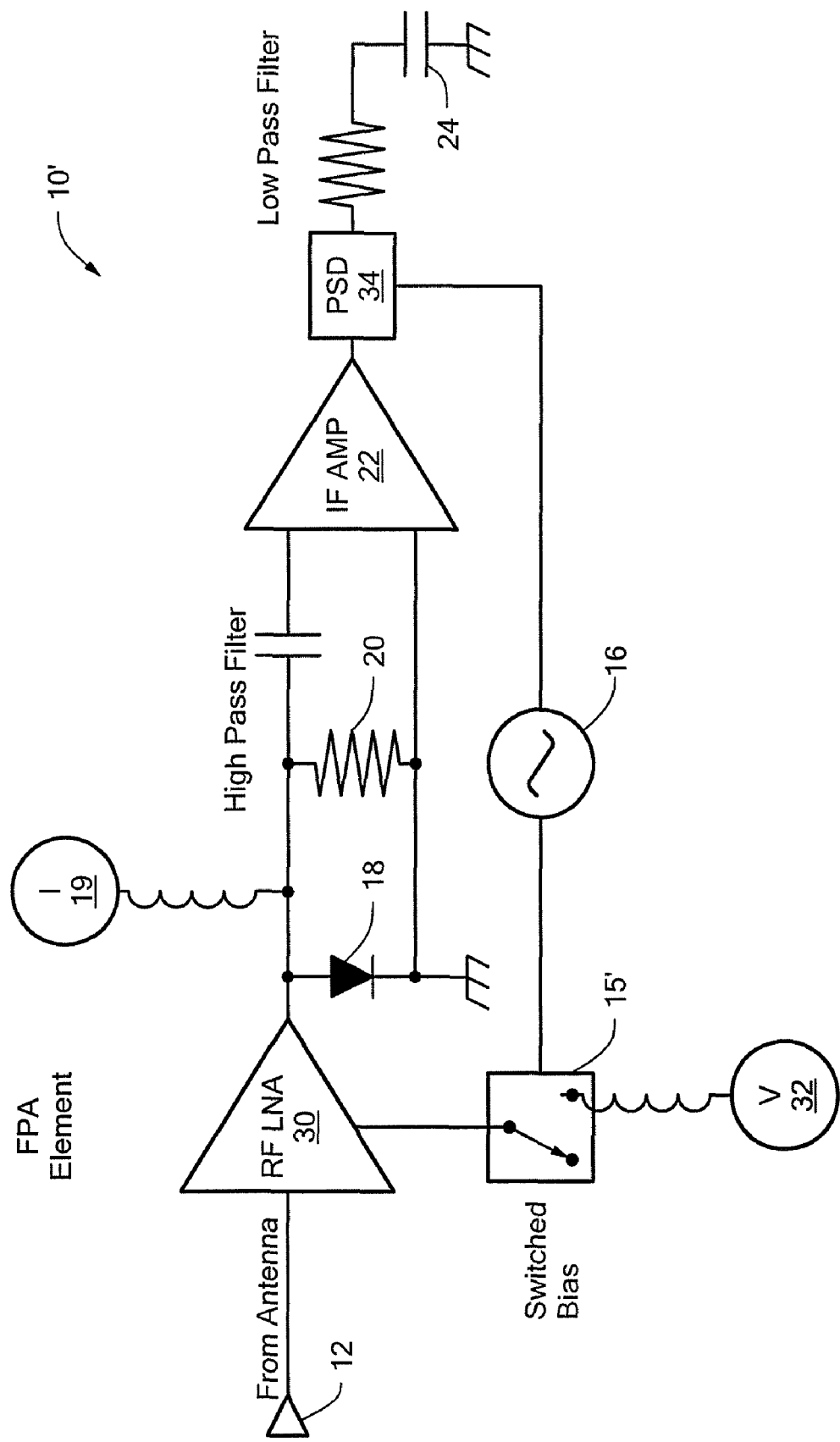
FIG. 7 is a schematic diagram of a system for Periodic Switching of the Input Signal Enabling the Use of a Low Pass Filter Thereby Achieving Chopped Detection having Integrated Phase Sensitive Detection Can be Achieved by Synchronized Switching of the RF and IF amplifier according to the invention.

Referring now to FIG. 7, in one embodiment, the system 10' also includes an antenna 12 for receiving the radio frequency energy. Here, the received RF energy is fed to a low noise amplifier (LNA) 30. The LNA bias current supply 32 is fed to the LNA 30 through the switch 15', as shown. Thus, here a modulator 14' for the received RF energy is provided by the switch 15' responsive to a reference frequency signal produced by an oscillator 16. The modulator 14' pulse modulates the received radio frequency energy at the reference frequency signal produced by an oscillator 16; more particularly by periodically interrupting the bias current 32 to LNA to correspondingly turn the LNA 30, "on" and "off". The system 10' includes detector 18, here a diode detector, having a bias current produced by DC supply 19, for homodyning the pulse modulated signal to convert such pulse modulated signal to a detector output signal having a low frequency component representative of the amplitude of the received radio frequency energy and a high frequency component at the reference frequency signal produced by an oscillator 16. A high pass filter or band pass filter 20 centered at the reference frequency and having a bandwidth of a few percent of the center frequency is fed from the detector 18 output signal for passing the high frequency components and for removing the low frequency component. An intermediate frequency (IF) signal amplifier 22 has an input fed by an output of the high pass filter 20. A low pass filter 24 has an input fed by an output of the IF amplifier 22 through a phase sensitive detector (PSD) 34, as shown. The periodic switching of the received RF signal by the periodic "on" and "off" switching of the LNA 30 transforms the DC level of the received signal into a pulse modulated signal and thereby enables the use of a high pass filter 20 (which also blocks the DC bias current from supply 19 from influencing the amplifier 22

As noted above, the phase sensitive detector (PSD) 34 has an input fed by the output of the IF amplifier 22 and is fed by the reference frequency signal provided by the oscillator 16. The low pass filter 24 at the output of the IF amplifier 22 averages the pulsed output and is therefore representative of the DC level of the received signal. In short, the DC level produced by the detector 18 is up-converted in frequency from DC to a predetermined IF signal (i.e., the switching frequency, i.e., the frequency of the signal produced by oscillator 16), the IF signal is amplified by IF amplifier 32, and the amplified IF signal is then filtered back to DC by the low pass filter 24; noise produced by the switch 15' being removed by the synchronous action of the PSD 34. Thus, the switched bias to the low noise amplifier 30 provided by the switching action of switch 15' produced in response to the switching signal produced by oscillator 16 on DC current bias 32 is synchronous with same signal provided by oscillator 16 also fed to the PSD 34. The phase sensitive detector 34 produces an output representative of the signal for which any phase drift or jitter in the oscillator 16 is self cancelled since both the switch 15' and the PSD 34 are fed by the same signal, i.e., the signal produced by the oscillator 16. As noted above, the output of the phase sensitive detector 34 is fed to the low pass filter 24, as shown A number of embodiments of the invention have been described. Nevertheless, it will be understood that various modifications may be made without departing from the spirit and scope of the invention. Accordingly, other embodiments are within the scope of the following claims.

What is claimed is:

1. A system for detecting amplitude of radio frequency energy, comprising:
   an antenna for receiving the radio frequency energy;
   a modulator, responsive to a reference frequency signal, for pulse modulating the received radio frequency energy at the reference frequency;
   a detector for homodyning the pulse modulated signal to convert such pulse modulated signal to a detector output signal having a low frequency component representative of the amplitude of the received radio frequency and a high frequency component at the reference frequency signal;
   a high pass or band pass filter fed for the detector output signal for passing the high frequency components and for removing the low frequency component.

2. The system recited in claim 1 wherein the diode is biased and the high pass or pass band filter filters the DC bias, the bandpass filter being centered at the reference frequency and having a bandwidth of a few percent of the center frequency.

3. The system recited in claim 1 including: a phase sensitive detector fed by the reference frequency signal and the high frequency components passed by the high pass or band pass filter for producing an output representative of the high frequency components passed by the high pass filter.

4. The system recited in claim 3 wherein the modulator includes a low noise amplifier fed by the antenna and having a bias fed by the reference frequency signal, such low noise amplifier pulse modulating the received radio frequency energy at the reference frequency.

5. The system recited in claim 3 including a low pass or band pass filter fed by the phase detector.

6. The system recited in claim 4 including a low pass or band pass filter fed by the phase detector.

7. A system for detecting amplitude of radio frequency energy, comprising:
   an antenna for receiving the radio frequency energy;
   a modulator, responsive to a reference frequency signal, for pulse modulating the received radio frequency energy at the reference frequency;
   a detector including a diode for converting such pulse modulated signal to a detector output signal having a low frequency component representative of the amplitude of the received radio frequency energy and a high frequency component at the reference signal;
   a high pass or band pass filter fed for the detector output signal for passing the high frequency components and for removing the low frequency component.

8. The system recited in claim 7 wherein the diode is biased and the high pass or pass band filter filters the DC bias.

9. The system received in claim 7 including: a phase detector fed by the reference frequency and the high frequency components passed by the high pass or band pass filter, the bandpass filter being centered at the reference frequency and having a bandwidth of a few percent of the center frequency.

10. The system recited in claim 9 wherein the modulator includes a low noise amplifier fed by the antenna and having a bias fed by the reference frequency signal, such low noise amplifier pulse modulating the received radio frequency energy at the reference frequency.

11. The system recited in claim 9 including a low pass filter fed by the phase detector.

12. The system recited in claim 10 including a low pass or band pass filter fed by the phase detector.

13. A system comprising:
    an antenna;
    a switch;
    a diode detector connected to the antenna through the switch;
    a low noise amplifier having a bias fed thereto through the switch; and
    a high pass or band pass filter coupled to an output of the low noise amplifier through the diode detector; and
    including an intermediate frequency amplifier having an input coupled to an output of the high pass or band pass filter and wherein the bias to the low noise amplifier is switched by the switch synchronously with a signal at an output of the intermediate frequency amplifier.

14. A system comprising:
    an antenna;
    a switch;
    a diode detector connected to the antenna through the switch;
    a low noise amplifier having a bias fed thereto through the switch; and
    a high pass or band pass filter coupled to an output of the low noise amplifier through the diode detector; and
    including an intermediate frequency amplifier having an input coupled to an output of the high pass or band pass filter.

15. The system recited in claim 13 including a phase sensitive detection section, such section having a a phase detector fed by an output of the intermediate frequency amplifier, such section producing a switching signal for the switch, such switch signal also being fed to the phase detector.

16. The system recited in claim 15 including an intermediate frequency amplifier having an input coupled to an output of the high pass or band pass filter.

* * * * *